US009902300B2

(12) United States Patent
Hein et al.

(10) Patent No.: US 9,902,300 B2
(45) Date of Patent: Feb. 27, 2018

(54) LEAN-IN CORNERING PLATFORM FOR A MOVING VEHICLE

(71) Applicant: BOSE CORPORATION, Framingham, MA (US)

(72) Inventors: Travis Lee Hein, Holliston, MA (US); Lawrence D. Knox, Hopkinton, MA (US)

(73) Assignee: ClearMotion Acquisition I LLC, Woburn, MA (US)

(*) Notice: Subject to any disclaimer, the term of this patent is extended or adjusted under 35 U.S.C. 154(b) by 161 days.

(21) Appl. No.: 14/934,503

(22) Filed: Nov. 6, 2015

(65) Prior Publication Data

US 2017/0129372 A1   May 11, 2017

(51) Int. Cl.
| | |
|---|---|
| B60R 22/00 | (2006.01) |
| E05F 15/00 | (2015.01) |
| G05D 1/00 | (2006.01) |
| B60N 2/39 | (2006.01) |
| B60N 2/10 | (2006.01) |

(52) U.S. Cl.
CPC ............... B60N 2/39 (2013.01); B60N 2/10 (2013.01)

(58) Field of Classification Search
CPC ............ B60N 2/10; B60N 2/39; A61G 5/104
USPC ............................................. 701/49; 180/326
See application file for complete search history.

(56) References Cited

U.S. PATENT DOCUMENTS

| | | | |
|---|---|---|---|
| 6,637,816 B2 | 10/2003 | Pavlov et al. | |
| 8,095,268 B2 | 1/2012 | Parison et al. | |
| 2001/0037169 A1 | 11/2001 | Clair | |
| 2004/0089488 A1 | 5/2004 | Bremner | |
| 2006/0261647 A1 | 11/2006 | Maas et al. | |
| 2007/0260383 A1* | 11/2007 | Sundaram ......... | B60W 50/0205 701/70 |
| 2008/0255734 A1* | 10/2008 | Altshuller ............ | B60N 2/0244 701/49 |
| 2011/0172886 A1 | 7/2011 | Taira et al. | |

(Continued)

FOREIGN PATENT DOCUMENTS

| | | |
|---|---|---|
| GB | 2313214 A | 11/1997 |
| WO | 9728981 A1 | 8/1997 |
| WO | 01083261 A1 | 11/2001 |

OTHER PUBLICATIONS

International Search Report and Written Opinion for application No. PCT/US2016/060132 dated Feb. 28, 2017.

*Primary Examiner* — Isaac Smith
(74) *Attorney, Agent, or Firm* — Wolf, Greenfield & Sacks, P.C.

(57) ABSTRACT

Systems and methods for improving ride quality of an active payload support system. In one example, a seat system for a vehicle includes a seat, a support structure including an actuator configured to rotate the seat about an axis of a pivot, a first sensor positioned to detect movement of the vehicle, and a controller configured to receive a first input from the first sensor, determine a cornering lateral acceleration of the vehicle in a direction perpendicular to an axis parallel to a direction of travel of the vehicle around a turn, the cornering lateral acceleration determined based at least on the first input, generate a command signal based at least on the cornering lateral acceleration to instruct an actuator to rotate the seat about the axis of the pivot in a direction of the turn, and provide a force command to the actuator to move the seat.

26 Claims, 7 Drawing Sheets

(56) References Cited

U.S. PATENT DOCUMENTS

| | | |
|---|---|---|
| 2013/0131923 A1 | 5/2013 | Tzipman |
| 2014/0316661 A1* | 10/2014 | Parker .................. B60N 2/39 |
| | | 701/49 |
| 2014/0358378 A1 | 12/2014 | Howard et al. |
| 2015/0081171 A1 | 3/2015 | Ericksen et al. |
| 2016/0101664 A1* | 4/2016 | Richter ............... B60G 99/002 |
| | | 701/49 |
| 2017/0129367 A1 | 5/2017 | Hein |
| 2017/0129371 A1 | 5/2017 | Knox |
| 2017/0129373 A1 | 5/2017 | Knox et al. |

* cited by examiner

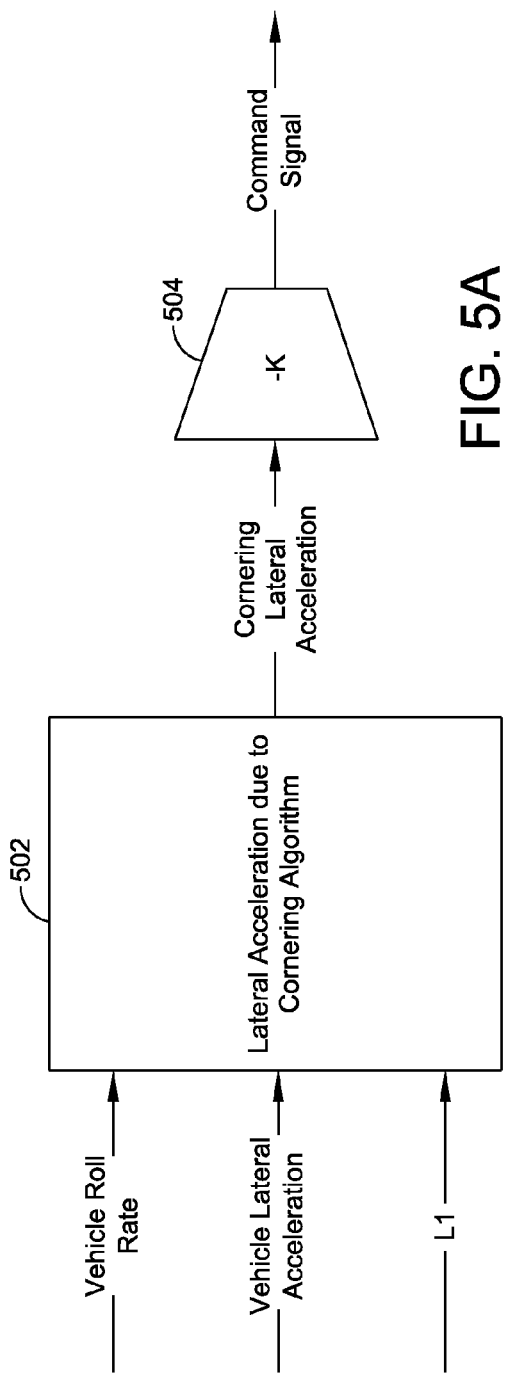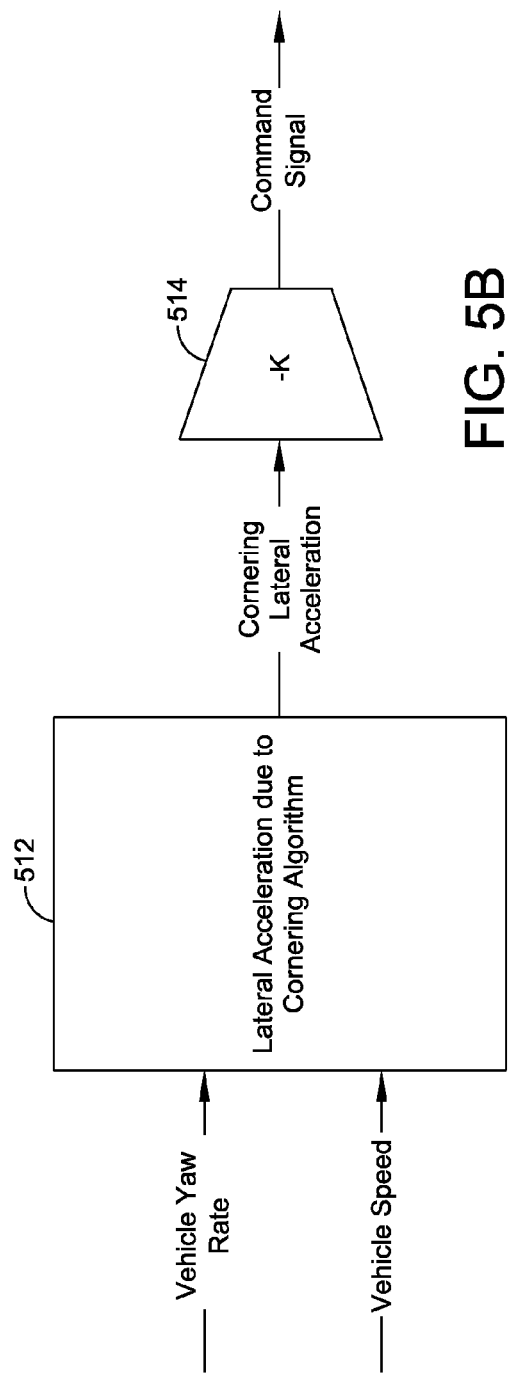

LEAN-IN CORNERING PLATFORM FOR A MOVING VEHICLE

TECHNICAL FIELD

Aspects and implementations of the present disclosure are directed generally to payload suspension, and in some examples, more specifically to vehicle seats and methods for vehicle movement compensation.

BACKGROUND

In a Cartesian coordinate system (X, Y, and Z directions) a payload held by a supporting platform may be subject to motion in various directions. For example, an occupant positioned upon a vehicle seat, an occupant positioned within a wheelchair, or an occupant located within a neonatal incubator, may be subject to motion in up to six degrees of freedom, including translation and rotation about each of a roll, pitch, and yaw axis. Due to lateral accelerations during steering the vehicle, the payload often experiences disturbances when a vehicle attached to the platform travels around a corner. In particular, disturbances as a result of cornering acceleration can be especially dramatic when the corner is traversed at a sharp angle, or the vehicle is traveling at a high rate of speed. Similar disturbances may be experience when the vehicle accelerates in a forward direction, or stops (e.g., brakes).

SUMMARY

In accordance with aspects of the present disclosure, there are provided systems and methods for improving ride quality of an active payload support system. For example, there are provided a vehicle seat, a seat system for a vehicle, and methods for controlling seat movement in a vehicle. In one example, the seat system includes a seat positioned at a command angle relative to a nominal substantially horizontal position, and a controller configured to generate a command signal to instruct an actuator coupled to the seat to adjust the command angle to compensate for movement of the vehicle during a cornering event, forward acceleration event, or stopping event. In particular, aspects and implementations are directed to a vehicle seat and system configured to determine a cornering lateral acceleration of the vehicle due to the cornering event and generate a command signal so as to instruct the actuator to lean-in the seat substantially in a direction of the corner. Similarly, aspects and implementations are directed to a vehicle seat and system configured to determine a forward acceleration of the vehicle and/or a force due to braking, and generate a command signal so as to instruct the actuator to lean-in the seat substantially in a forward or backward direction. One or more force commands may be provided based on the command signal to cause the actuator to move the seat to the desired position. Accordingly, various aspects and implementations improve the comfort and ride experience and create a more "natural" movement of the seat during cornering events, forward acceleration events, and braking. While various aspects and implementations are described herein with reference to a vehicle seat or a vehicle seat system, further aspects and implementations may include other platforms systems for supporting a payload sensitive to disturbance, such as wheelchairs, gurneys, beds, neonatal incubators, and heavy machinery.

According to one aspect, provided is a method of controlling the movement of a seat coupled to a vehicle. The method may include receiving a first input from a first sensor positioned to measure movement of the vehicle, determining a cornering lateral acceleration of the vehicle in a direction substantially perpendicular to an axis extending parallel to a direction of travel of the vehicle around a turn, the cornering lateral acceleration being determined based at least in part on the first input, generating a command signal based at least in part on the cornering lateral acceleration of the vehicle to instruct an actuator coupled to the seat to rotate the seat about a first axis of a pivot in substantially a direction of the turn, and providing a force command to the actuator to move the seat based on the command signal.

In one example, the method may further include receiving a second input from a second sensor positioned to measure movement of the vehicle. In a further example, the first input includes a vehicle roll rate, and the second input includes a total lateral acceleration of the vehicle in the direction substantially perpendicular to the axis extending parallel to the direction of travel of the vehicle around the turn. According to an example, the method may further include determining a distance between the first axis and a second axis about which the vehicle may rotate. In a further example, determining the cornering lateral acceleration of the vehicle includes determining the cornering lateral acceleration based at least in part on the total lateral acceleration, the vehicle roll rate, and the distance between the first axis and the second axis.

According to an example, the first input includes a vehicle yaw rate and the second input includes a vehicle speed. In a further example, determining the cornering lateral acceleration of the vehicle includes determining the cornering lateral acceleration based at least in part on the yaw rate and the vehicle speed. In one example, the method may further include adjusting a gain of the command signal responsive to receiving a responsiveness command. In a further example, the responsiveness command includes a user input.

According to another aspect, provided is seat system for a vehicle. The seat system may include a seat, a support structure coupled to the seat and including an actuator configured to rotate the seat about a first axis of a pivot, at least a first sensor positioned to detect movement of the vehicle, and a controller configured to receive a first input from the first sensor, determine a cornering lateral acceleration of the vehicle in a direction substantially perpendicular to an axis extending parallel to a direction of travel of the vehicle around a turn, the cornering lateral acceleration being determined based at least in part on the first input, generate a command signal based at least in part on the cornering lateral acceleration of the vehicle to instruct an actuator coupled to the seat to rotate the seat about the first axis of the pivot in substantially a direction of the turn, and provide a force command to the actuator to move the seat based on the command signal.

In one example, the controller is further configured to receive a second input from at least a second sensor positioned to measure movement of the vehicle. According to an example, the first input includes a vehicle roll rate, and the second input includes a total lateral acceleration of the vehicle in the direction substantially perpendicular to the axis extending parallel to the direction of travel of the vehicle around the turn. According to a further example, the controller is further configured to determine a distance between the first axis and a second axis about which the vehicle may rotate. In one example, the controller is configured to determine the cornering lateral acceleration based at least in part on the total lateral acceleration, the vehicle roll rate, and the distance between the first axis and the second axis.

According to an example, the first input includes a vehicle yaw rate and the second input includes a vehicle speed. In a further example, the controller is configured to determine the cornering lateral acceleration based at least in part on the yaw rate and the vehicle speed. In one example, the controller is further configured to adjust a gain of the command signal responsive to receiving a responsiveness command. In a further example, the responsiveness command includes a user input.

According to another aspect, provided is a seat for a vehicle. The seat for a vehicle may include a seat, and a controller configured to receive a first input of detected movement of the vehicle, determine a cornering lateral acceleration of the vehicle in a direction substantially perpendicular to an axis extending parallel to a direction of travel of the vehicle around a turn, the cornering lateral acceleration being determined based at least in part on the first input, generate a command signal based at least in part on the cornering lateral acceleration of the vehicle to instruct an actuator coupled to the seat to rotate the seat about a first axis of a pivot in substantially a direction of the turn, and provide a force command to the actuator to move the seat based on the command signal.

In one example, the controller is further configured to receive a second input of detected movement of the vehicle. According to an example, the first input includes the vehicle roll rate, and the second input includes a total lateral acceleration of the vehicle in the direction substantially perpendicular to the axis extending parallel to the direction of travel of the vehicle around the turn. In one example, the controller is further configured to determine a distance between the first axis of the pivot and a second axis about which the vehicle may rotate. In a further example, the controller is configured to determine the cornering lateral acceleration based at least in part on the total lateral acceleration, the vehicle roll rate, and the distance between the first axis of the pivot and the second axis.

According to one example, the first input includes a vehicle yaw rate and the second input includes a vehicle speed. In a further example, the controller is configured to determine the cornering lateral acceleration based at least in part on the yaw rate and the vehicle speed. In one example, the controller is further configured to adjust a gain of the command signal responsive to receiving a responsiveness command.

According to another aspect, provided is a method of controlling seat movement in a vehicle. In one example, the method may include receiving a first input from at least a first sensor positioned to measure movement of the vehicle, determining an acceleration of the vehicle, the acceleration being based at least in part on the first input, generating a command signal based at least in part on the acceleration of the vehicle to instruct an actuator coupled to the seat to rotate the seat about an axis of a pivot in substantially a direction of the acceleration to lean-in the seat, and providing a force command to the actuator to move the seat based on the command signal. In one example, the acceleration includes a cornering lateral acceleration of the vehicle, and the direction of the acceleration includes a direction substantially perpendicular to an axis extending parallel to a direction of travel of the vehicle around a turn. According to another example, the acceleration includes one of a forward acceleration or a braking acceleration, and the direction of acceleration includes a direction substantially parallel to a direction of travel of the vehicle.

Still other aspects, examples, and advantages of these exemplary aspects are discussed in detail below. Further implementations may include means for performing any of the processes recited herein. Moreover, it is to be understood that both the foregoing information and the following detailed description are merely illustrative examples of various aspects, and are intended to provide an overview or framework for understanding the nature and character of the claimed subject matter. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

Furthermore, in the event of inconsistent usages of terms between this document and documents incorporated herein by reference, the term usage in the incorporated references is supplementary to that of this document; the term usage in this document controls. In addition, the accompanying drawings are included to provide illustration and a further understanding of the various aspects and examples, and are incorporated in and constitute a part of this specification. The drawings, together with the remainder of the specification, serve to explain principles and operations of the described and claimed aspects and examples.

BRIEF DESCRIPTION OF THE DRAWINGS

FIGS. 5A-5C illustrate example process flows for generating a command signal according to various aspects discussed herein.

DETAILED DESCRIPTION

Figure 1B:
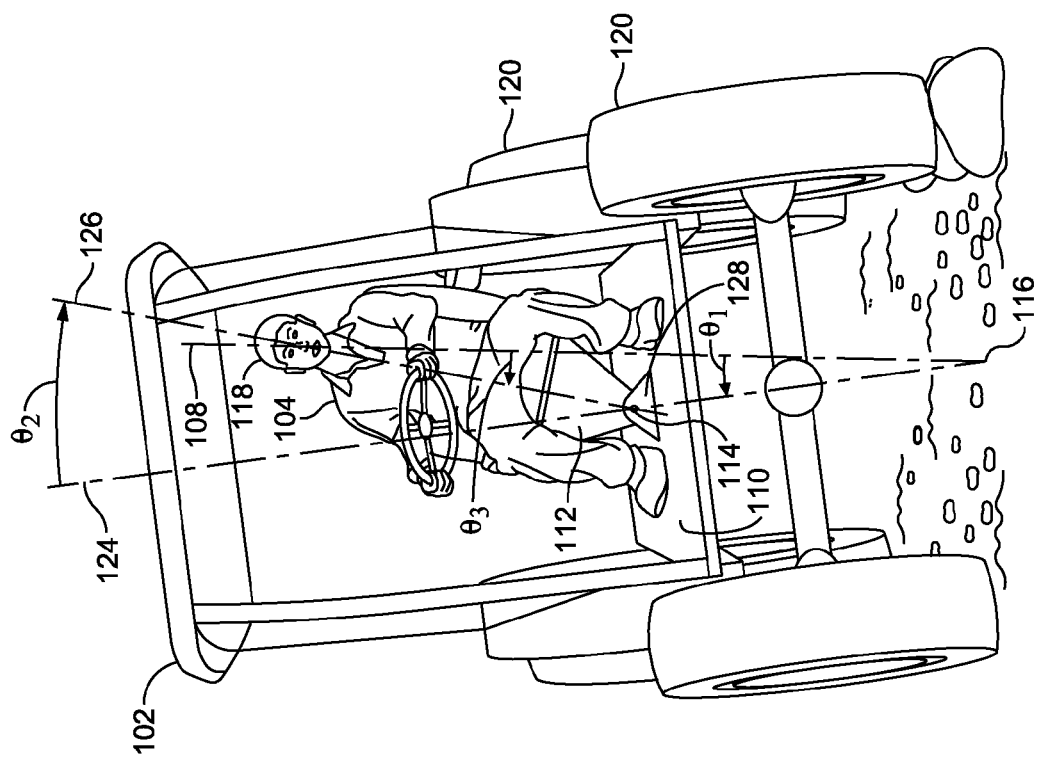
FIG. 1B is an illustration of the vehicle of FIG. 1A experiencing a cornering event.

Aspects and implementations disclosed herein are not limited to the details of construction and the arrangement of components set forth in the following description or illustrated in the drawings. Aspects and implementations disclosed herein are capable of being practiced or of being carried out in various ways.

Several aspects and implementations discussed herein are generally related to systems and methods for improving ride quality of an active payload support system. While described primarily within the context of an occupant supported by a vehicle seat, or vehicle seat system, other implementations may include wheelchairs, gurneys, beds, neonatal incubators, heavy machinery, and any other systems or apparatuses capable of actively isolating a payload from a disturbance.

In at least one example, a vehicle seat system includes a seat and a controller for controlling rotation of the seat during cornering events, forward acceleration events, or braking events of an associated vehicle. Cornering events, as used herein, may occur when the vehicle changes from a linear path of travel to any bending path of travel, such as traveling through a turn. In particular, during cornering events, the system actively controls a roll (and/or pitch or yaw) of the seat by generating a command signal and issuing a force command to an actuator coupled to the seat. The actuator can induce roll (and/or pitch or yaw) into the seat to rotate the seat in a direction of the turn. Similarly, during forward acceleration events and braking events, the system may actively control a pitch of the seat by generating a command signal and issuing a force command to the seat. The actuator can induce pitch into the seat to lean the seat in a substantially forward direction during forward acceleration, and in a substantially backward direction during braking. Seat rotation during cornering events, forward acceleration events, and braking events, as described in various implementations, provides or more comfortable and "natural" ride experience for an occupant or user of the seat. Compared to traditional vehicle seats, which remain at a fixed position during travel, various implementations match movement of the seat to movement of the vehicle, providing a more fluid and responsive riding experience, similar to that which a rider may experience on a motorcycle.

Figure 1A:
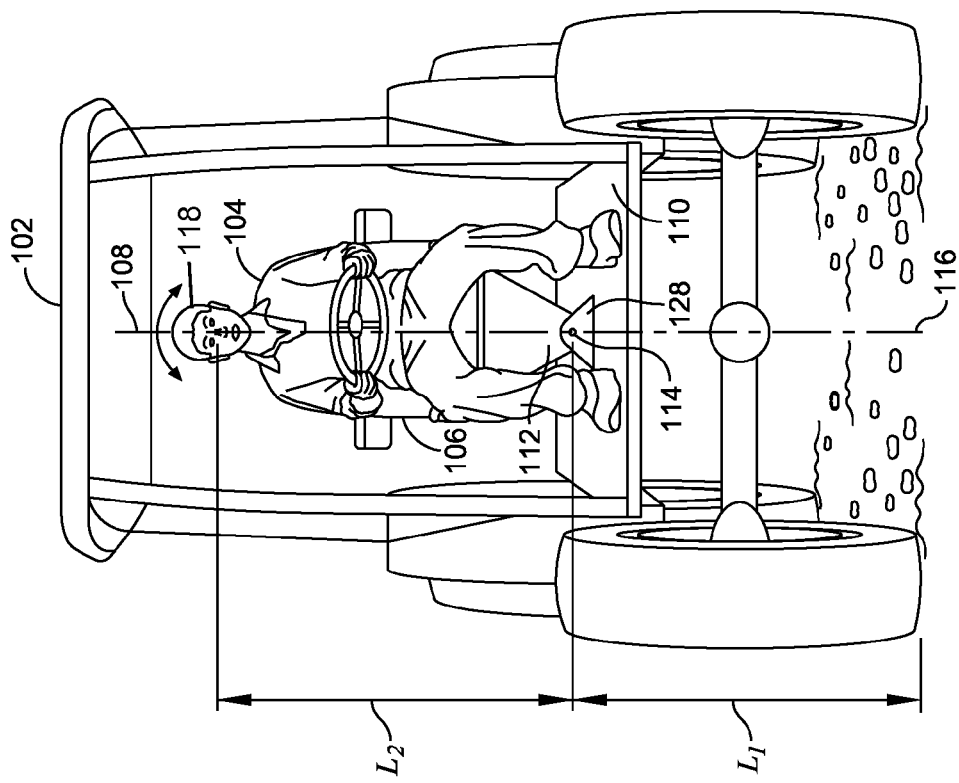
FIG. 1A is an illustration of a vehicle.

Several examples discussed herein include a vehicle seat and a seat system for a vehicle. FIGS. 1A and 1B illustrate an example seat and seat system for a vehicle according to several implementations. In particular, FIG. 1A shows a vehicle 102 in the form of a tractor traveling on a substantially level surface, and FIG. 1B shows the tractor 102 encountering a cornering event at a vehicle roll angle of $\theta_1$. It is appreciated that portions of the tractor 102 shown in FIGS. 1A and 1B have been omitted to facilitate description of various implementations. In FIG. 1A, a person 104 is shown sitting in the seat 106 in a substantially vertical orientation along an imaginary reference vertical centerline 108 which passes through the body of the person 104 who is sitting in the seat 106. In this example, the vertical centerline 108 bisects the person 104 and the seat 106 when both the seat 106 and the vehicle 102 are in a nominal, level horizontal orientation as shown in FIG. 1A. This is because the seat 106 is substantially symmetrical as viewed in FIG. 1A. In other types of vehicles, the seat 106 may be located to the left or right of the vertical centerline 108.

The seat 106 is secured to the floor 110 of the vehicle via a support structure 112. The support structure 112 includes a pivot 128 which permits the seat 106 to move/rotate relative to the vehicle 102 about an axis 114 of the pivot 128. The axis 114 is substantially parallel to a direction in which the vehicle 102 is moving when the vehicle 102 is moving in a straight line. FIGS. 1A and 1B show the axis 114 located at a distance below the seat 106, and in various implementations the axis 114 may be located higher or lower than shown. The axis 114 is fixed relative to the vehicle 102. In various implementations the vehicle 102 may roll about a second axis 116 which is substantially parallel with the first axis 114 and the direction in which the vehicle 102 is moving.

As shown in FIG. 1A, a distance L1 represents the length between the first axis 114 and the second axis 116. A second distance, L2, represents the length between the first axis 114 and a substantially center virtual point of the payload (e.g., a center of a head 118 of the occupant 104 of the vehicle 102). In various implementations, the top end of L2 will reside at or above a position associated with the head of a person sitting in the seat, and for example, may be in a range of 3-5 feet.

In FIG. 1B, the vehicle 102 is shown experiencing a cornering event (i.e., making a turn to the right, when viewed from the front). Rotation about the axis 116 is an approximation for the roll of the vehicle 102 about the bottom of the right tires and is used for symmetry. The vehicle 102 has approximately rolled by the vehicle roll angle $\theta_1$, which represents the angle between the vertical centerline 108 and a vehicle centerline 124. If the seat 102 is not positioned at the center of the vehicle 102 (i.e., positioned to one or the other side of the center), then $\theta_1$ is determined by the rotation of the vehicle centerline 124 from the nominal position in FIG. 1A to a rotated position (e.g., in FIG. 1B).

In several implementations, the seat 106 is rotated about the axis 114 substantially in the direction of the turn. For example, when the vehicle 102 encounters a right hand turn, the seat is rotated in the clock-wise direction, in the direction of the turn. Similarly, when the vehicle 102 encounters a left hand turn, the seat is rotated in the counter-clock-wise direction, in the direction of the turn. The seat 106 may be rotated by an actuator coupled to the support structure 112. In both implementations, a controller in communication with at least the actuator provides a force command to cause the actuator to rotate the seat by an angle $\theta_2$, which is the angle between the vehicle centerline 124 and a seat centerline 126.

In various implementations, the angle $\theta_2$ is determined based at least on the cornering lateral acceleration of the vehicle. As described herein, the cornering lateral acceleration of the vehicle 102 includes the lateral acceleration of the vehicle as a result of the cornering event. It is appreciated that the lateral acceleration of the vehicle may be influenced by numerous factors, some of which may be unrelated to a cornering event, such as a roll rate of the vehicle about the second axis 116 when an obstruction is encountered. Accordingly, in various examples the controller is configured to determine the cornering lateral acceleration of the vehicle based on a total lateral acceleration of the vehicle, which may include other acceleration components in addition to the cornering lateral acceleration. Returning to FIGS. 1A and 1B, in some implementations, locating the axis 114 close to the floor 110 is preferable. As a result, the person 104 is rotated about a position to substantially lean the driver into the turn.

Figure 2:
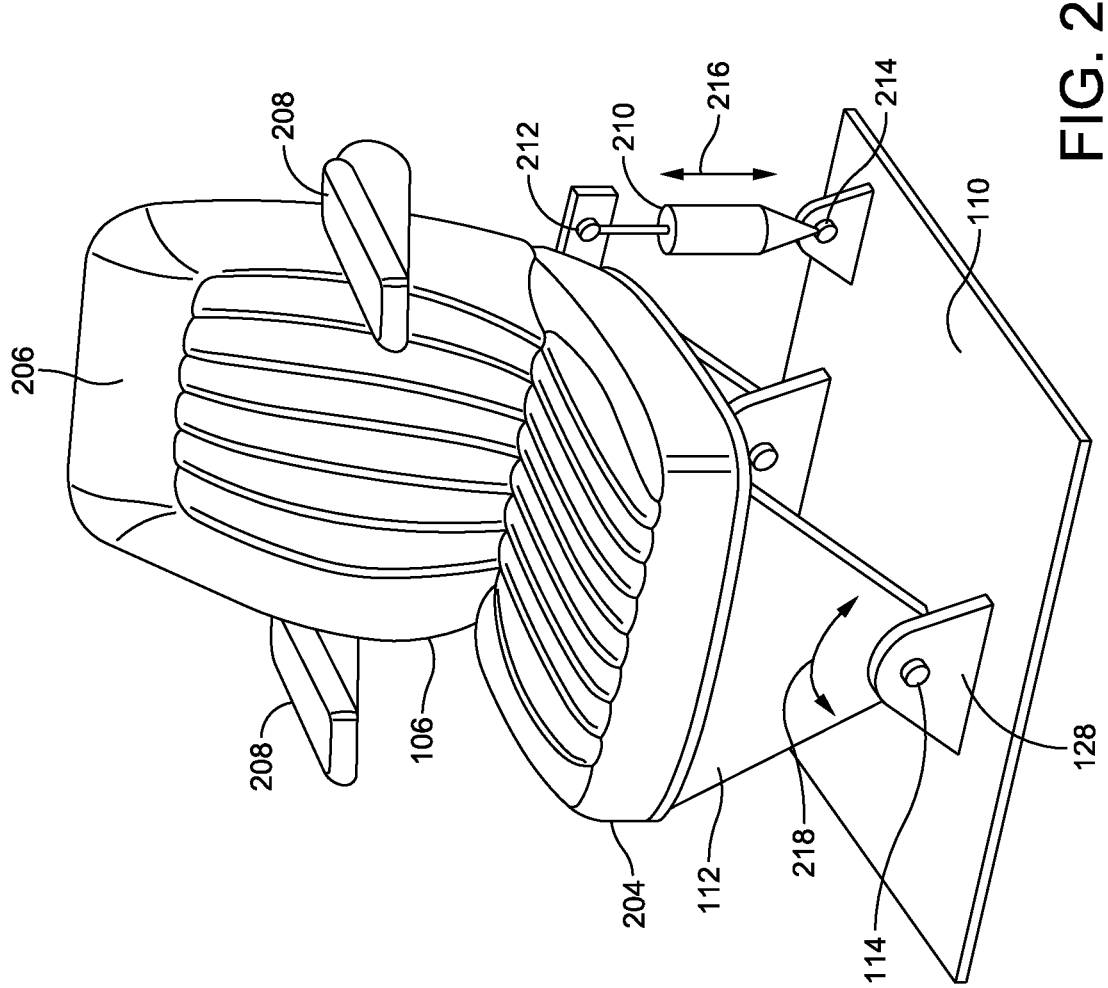
FIG. 2 is an illustration of an example vehicle seat and vehicle seat system according to various aspects discussed herein.

Turning now to FIG. 2 with continuing reference to FIGS. 1A-1B, shown is one example of a vehicle seat system including a vehicle seat, such as vehicle seat 106 shown in FIGS. 1A and 1B. The seat 106 is shown with a bottom 204 and a seat back 206 which is connected to the bottom 204. A pair of arms 208 extends forward from the seat back 206. A linear actuator 210 is pivotally connected to the support structure 112 (at a location 212) and can interact with the seat 106 to cause the seat 106 to rotate via the pivot 128 about the axis 114. In this example, the linear actuator 210 is also pivotally connected to the floor 110 of the vehicle at a location 214. The linear actuator 210 is extended or retracted in the direction of a two-headed arrow 216 to cause the seat 106 to rotate about the axis 114 in the direction of a two-headed arrow 218. The linear actuator 210 can be, for example, an electromagnetic linear motor, a hydraulic cylinder, or a pneumatic cylinder. The linear actuator 210 instead can be some other type of actuator such as a rotary actuator (electromagnetic, hydraulic, or pneumatically powered) that is coupled between the seat 106 and the floor 110.

Any type of actuator can be directly coupled to the seat 106 or it may act through some type of gear train, linkages or other transmission mechanism. The actuator 210 can be connected to a different portion of the support structure 112, or seat 106, and a different portion of the vehicle 102 (other than the floor 110, e.g. a wall of the driver compartment). Control of the actuator 210 is further discussed below with reference to at least FIGS. 3-6.

The seat 106 is shown with only a single degree of freedom about the axis 114 (a roll axis) relative to the vehicle 102. This single degree of freedom could instead be about a pitch axis, a yaw axis, or about a plurality of axes (i.e., roll, pitch, and/or yaw). In this case, the axis 114 is oriented front-to-back as viewed in FIG. 1A and allows the seat 106 to be controlled for side to side rotation. In another example, the seat 106 may be outfitted with one or more additional actuators (not shown) to provide movement of the seat 106 in one or more additional degrees of freedom (e.g., front to back rotation). In one example, instead of mounting the intermediate support structure 112 to the floor 110, the intermediate support structure 112 can be mounted to a platform (not shown) which is moved up and down in the vertical direction by an additional actuator. The vertical active suspension system can be operated independently of the rotating seat 106. The $L_2$ distance (FIGS. 1A-1B) will vary with the motions associated with a vertical isolation mechanism. This effect can be included in the processor calculations based on inputs from a sensor which detects a distance between the platform and the floor. In addition, the vertical isolation system can be used to offset any potential raising or lowering of the head of the person due to the combined rotation of the vehicle (e.g., relative to the ground), and rotation of the seat relative to the vehicle. Further configurations for a vehicle seat and vehicle seat system may include those described in U.S. Pub. No. 2014/0316661, titled "SEAT SYSTEM FOR A VEHICLE," which is hereby incorporated by reference herein in its entirety.

Figure 3:
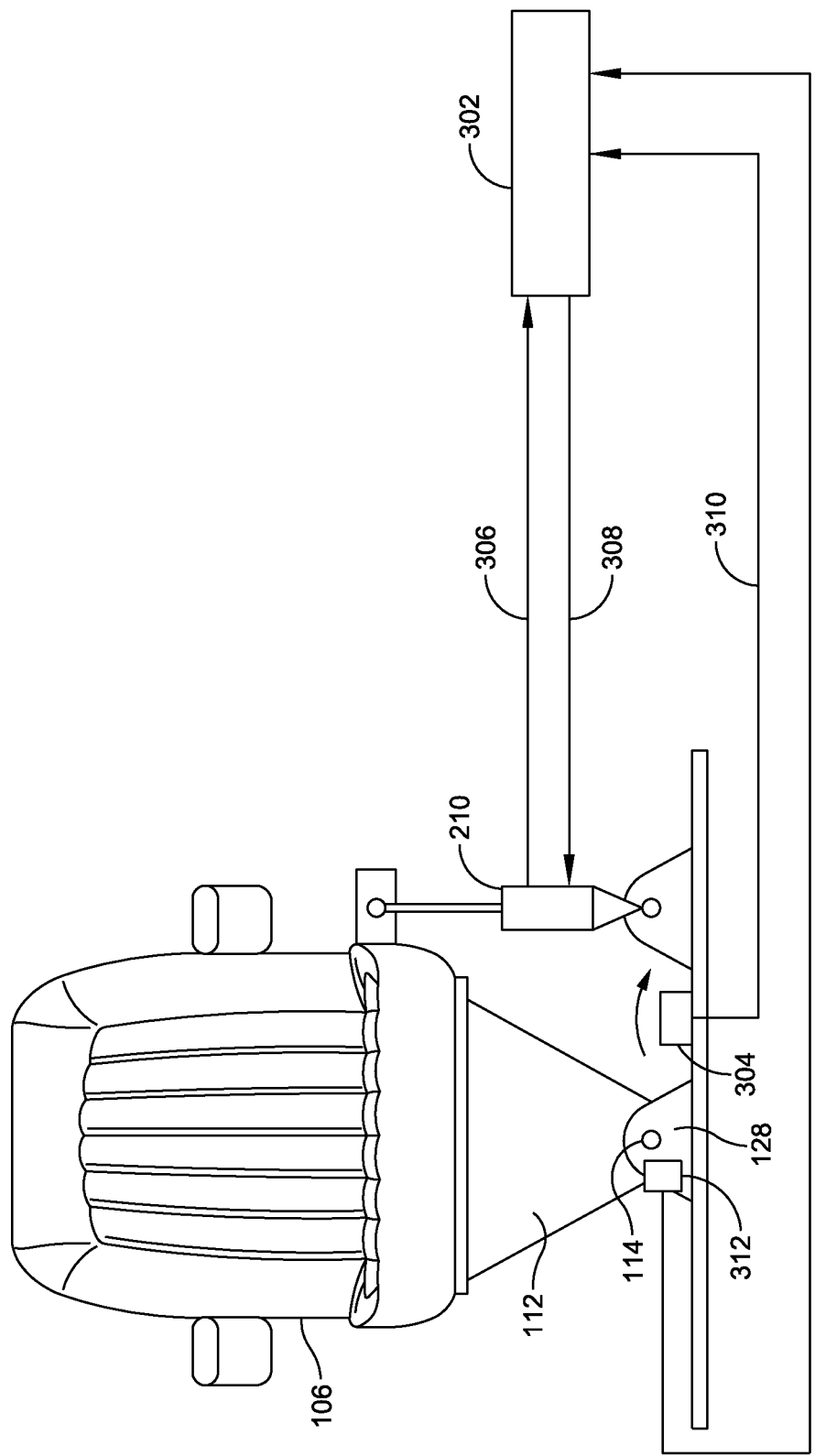
FIG. 3 is a further illustration of an example vehicle seat and vehicle seat system according to various aspects discussed herein.

Turning to FIG. 3, operation of the actuator 210 is controlled by a controller 302. A sensor 304 can measure an aspect of motion which in this example is a roll rate of the vehicle. The controller 302 receives an input from the sensor 304 in the form of roll rate data via a bus 310. In various examples, the sensor 304 includes a roll rate gyroscope. In various other examples, the input from the sensor 304 includes a component of a vehicle roll rate, and the controller 302 is configured to calculate the vehicle roll rate based on at least the component of the vehicle roll rate. A lateral accelerometer 312 is also provided on, for example, the vehicle 102 (FIGS. 1A-1B), the seat 106, or the pivot 128. It is preferable that this accelerometer is located at substantially the same height (or location) as the axis 114. The controller 302 receives an input (e.g., total lateral acceleration) from the lateral accelerometer 312 and an input (e.g., vehicle roll rate) from the sensor 304, and then calculates the cornering lateral acceleration of the vehicle due to the cornering event. If it is desired to calculate $L_1$ continuously in real time as the vehicle 102 is moving, the controller 302 may receive the input from the lateral accelerometer 312 and the sensor 304, and then calculate $L_1$ using the equation $L_1$=lateral velocity/roll rate where the lateral velocity is calculated by integrating the total lateral acceleration signal. It should be noted that preferably, gravity correction is done on the output of any lateral accelerometers described in this application. This means that the component of gravity coupled into the lateral accelerometer as the vehicle 102 and/or seat 106 rotates is taken into consideration.

In other implementations, the sensor 304 can measure an aspect of motion which includes a yaw rate of the vehicle. The controller 302 receives an input from the sensor 304 in the form of yaw rate data via the bus 310. For example, the sensor 304 may be positioned to detect rotation of the vehicle about a vertical axis extending through a center of the vehicle. In various examples, the sensor may also include any gyroscopic device that measures the vehicle's angular velocity around its vertical axis. In further implementations, the sensor 304 may include a steering wheel sensor positioned to detect movement of a steering wheel of the vehicle and measure a steering wheel angle (i.e., a degree of rotation of the steering wheel). One or more speed sensors (not shown) may also be provided, to measure a speed of the vehicle. The speed sensor may be positioned near a gear of the transmission to measure a speed of the vehicle relative to the rotation of the gear, as is known in the art. In other examples, the speed sensor may include a global positioning system (GPS) adapted to determine a speed of the vehicle. In one example, the GPS uses time and location data to determine the speed of the vehicle based on how much distance is covered within a given time frame. The controller 302 may receive inputs from the sensor 304 and the speed sensor, and calculate the cornering lateral acceleration of the vehicle due to the cornering event. Other appropriate methods for measuring the speed of the vehicle may be employed by further examples and are within the scope of this disclosure.

The controller 302 is configured to determine the cornering lateral acceleration of the vehicle based at least in part on the received inputs. In various examples, this may include the vehicle roll rate, the total lateral acceleration, and the distance between the first axis 114 and the second axis 116. In several other implementations, this may include the vehicle yaw rate and the vehicle speed of the vehicle. In still further implementations, this may include a steering wheel angle, the vehicle speed, and a predetermined ratio of degrees/g based on a speed of the vehicle. In various examples, the predetermined ratio of degrees/g may be determined based on repeated and varied calculations, which are continued until a desired user comfort level is obtained. The controller uses the cornering lateral acceleration of the vehicle to generate the command signal for instructing the actuator 210 coupled to the seat 106 to rotate the seat 106 about the first axis 114 of the pivot 128 at a desired command angle, $\theta_2$. The controller 302 may use a look-up table to determine the desired actuator position in order to achieve the calculated $\theta_2$. The actuator position look-up table may include any array that replaces a runtime computation with an indexing operation. For example, the actuator position look-up table may include an array of pre-calculated and indexed actuator positions stored in static program storage. The controller 302 receives position data from the actuator 210 via a bus 306. The position data is indicative of a position of the actuator 210 which is correlated to a position of the seat 106 about the axis 114. As such, the controller 302 is informed of the current position (e.g., displacement) of the actuator 210 when generating the command signal. Various control laws such as PI, PID, or other known control laws etc. can be used.

The controller 302 then issues a force command to the actuator 210 via a bus 308 which causes the actuator 210 to move to the desired actuator position. By successively repeating these steps, the controller 302 utilizes input from the sensor 304 to determine a desired motion of the seat 106 about the axis 114, and then operates the actuator 210 to cause the desired motion of the seat 106 about that axis. This results in the seat substantially leaning the occupant of the seat into a turn during a cornering event. In various examples, the controller 302 is configured to perform similar methods and processes to instruct the actuator 210 to induce pitch into the seat 106 to compensate for a forward acceleration of the vehicle and braking forces of the vehicle.

Several aspects and implementations are directed to improving the ride quality of an active payload support system. In particular, aspects and implementations are directed to a vehicle seat configured to determine a cornering lateral acceleration of the vehicle when turning a corner. Based on the cornering lateral acceleration, a controller within the system is configured to generate a command signal so as to instruct an actuator coupled to the seat to move the seat substantially in a direction of the turn. Seat rotation during cornering events, as described in various implementations, provides or more comfortable and "natural" ride experience for the occupant of the seat. Compared to traditional vehicle seats, which remain at a fixed position during travel, various implementations match movement of the seat to movement of the vehicle, providing a more fluid and responsive riding experience. The controller may position the seat relative to the amplitude of the cornering lateral acceleration and reposition the seat at a substantially level horizontal normal position after the cornering event has ceased (e.g., the vehicle has returned to a substantially straight course of travel).

Figure 4:
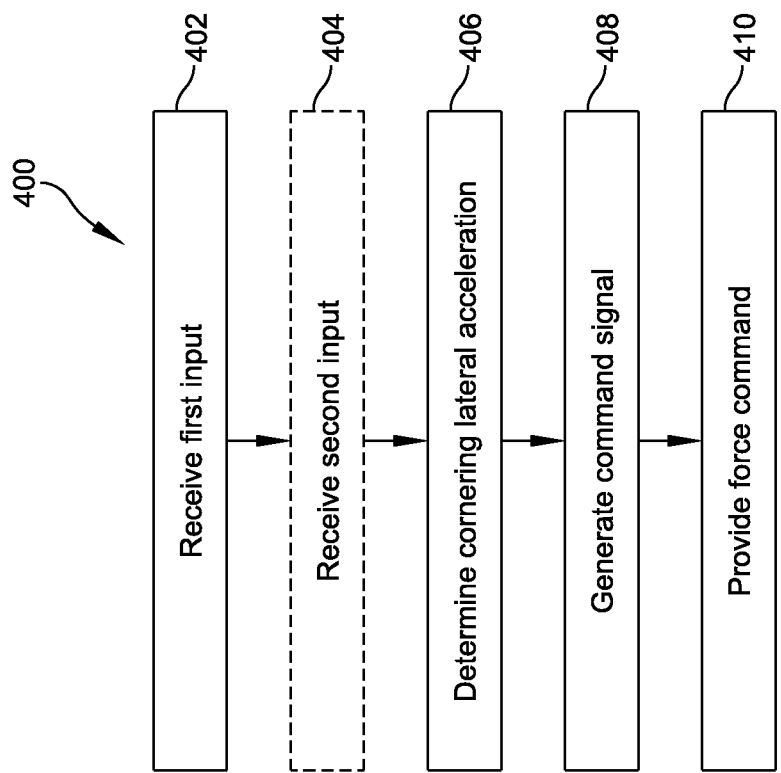
FIG. 4 is an example method for controlling movement of a vehicle seat according to various aspects discussed herein.

At least one method for controlling seat movement in a vehicle is discussed below with reference to FIG. 4. and continuing reference to the vehicle seat and vehicle seat systems described above with references to FIGS. 1-3. In various examples, such a method may include receiving an input, determining a cornering lateral acceleration, generating a command signal based at least in part on the cornering lateral acceleration, and providing a force command to an actuator to move the seat based on the command signal.

In act 402, the method 400 may include receiving a first input from at least a first sensor positioned to measure movement of the vehicle. In various implementations, receiving a first input includes receiving a signal from a sensor that can measure movement of the vehicle about an axis extending parallel to a direction of travel of the vehicle. In such an instance, the first input includes a roll rate of the vehicle. The controller receives the first input from the first sensor in the form of roll rate data via a bus. In several other implementations, receiving a first input includes receiving a signal from a sensor that can measure movement of the vehicle (e.g., twist or rotation) about a vertical axis extending through a center of the vehicle and perpendicular to a direction of travel of the vehicle when the vehicle is traveling in a linear course of travel. In such an instance, the input includes a yaw rate of the vehicle during a cornering event. The controller receives the first input from the first sensor in the form of yaw rate data via the bus. In further examples, receiving a first input includes receiving a signal from a sensor that can measure a steering wheel angle. In such an instance, the first input from the first sensor includes a steering wheel angle.

In further implementations, the method 400 may also include receiving a second input from a second sensor positioned to measure movement of the vehicle (act 404). Receiving a second input may include receiving a signal from an accelerometer that can measure a total lateral acceleration of the vehicle during a cornering event. As discussed above, the total lateral acceleration of a vehicle during a cornering event may include various components, such as a lateral acceleration corresponding to the roll rate in addition to the cornering lateral acceleration. The total lateral acceleration of the vehicle is measured in a direction substantially perpendicular to the axis extending parallel to the direction of travel of the vehicle. The controller receives the second input from the second sensor via a bus. In other implementations, receiving a second input includes receiving a signal from a speed sensor positioned to measure a speed of the vehicle. Similar to the accelerometer, the speed of the vehicle during the cornering event is received by the controller via the bus.

In act 406, the method 400 may include the act of determining a cornering lateral acceleration of the vehicle in a direction substantially perpendicular to the axis extending parallel to the direction of travel of the vehicle around a turn, the cornering lateral acceleration being determined based at least in part on the first input. In further implementations, the cornering lateral acceleration of the vehicle may be based on the first input and the second input, or the first input, the second input, and a third input. This may include determining the cornering lateral acceleration based on, for example, the yaw rate and the vehicle speed. In other examples, this may include determining the cornering lateral acceleration based on the roll rate, the total lateral acceleration, and a distance between a first axis about which the seat rotates and a second axis about which the vehicle may rotate (e.g., distance L1 shown in FIGS. 1A and 1B). In such an example, the distance $L_1$ may be predetermined and remain constant as the vehicle travels. If it is desired to calculate $L_1$ continuously in real time as the vehicle 102 is moving, the controller 302 may calculate $L_1$ using the equation $L_1$=lateral velocity/roll rate where the lateral velocity is calculated by integrating the lateral acceleration signal. In other implementations, the cornering lateral acceleration may be determined based on the steering wheel angle, vehicle speed, and a predetermined ratio of degrees/g based on a speed of the vehicle.

In act 408, the method 400 may include the act of generating a command signal based at least in part on the cornering lateral acceleration of the vehicle. The command signal may be used by the controller to instruct an actuator coupled to the seat to rotate the seat about the pivot at a command angle, $\theta_2$, in substantially a direction of the turn. The command angle is the angle between a vehicle centerline (e.g., centerline 124) and a seat centerline (e.g., centerline 126). In various implementations, the position of the seat at the particular command angle is adjusted relative to the determined cornering lateral acceleration. For example, the controller may use a look-up table to determine the desired actuator position in order to achieve the calculated $\theta_2$ based on the determined cornering lateral acceleration of the vehicle. The actuator position look-up table may include any array that replaces a runtime computation with an indexing operation, as described above with reference to FIG. 3. For example, the actuator position look-up table may include an array of pre-calculated and indexed actuator positions stored in static program storage. For example, the seat may be positioned at a large command angle when the cornering lateral acceleration is large and a small command angle when the cornering lateral acceleration is small. In one implementation, the seat may be leaned-in at a command angle between 0.5 and 1.0 deg/(m/s/s). In such an implementation, the angle may saturate at positive or negative saturation angle (e.g., ±4.0 deg.). Accordingly, a typical cornering event causing 0.2 g may result in approximately 1.0 to 2.0 degrees of lean-in. In other examples, the controller may perform one or more runtime computations to determine the desired actuator position in order to achieve the calculated $\theta_2$.

In further implementations, the controller may be configured to adjust the responsiveness of the seat or seat system to cornering events. It is appreciated that the perceived naturalness of seat movements during cornering events may be largely influenced by user preferences. For example, while some users may enjoy large seat rotations during cornering events, other users may prefer the seat to remain substantially level with only slight rotations. Accordingly, method 400 may additionally include the act of adjusting a gain of the command signal responsive to receiving a responsiveness command. The responsiveness input may be received from one or more user input devices coupled with the controller, such as a keyboard, mouse device, trackball, microphone, touch screen, printing device, display screen, button, switch, or dial. In various implementations, the controller adjusts the gain of the command signal by adjusting a gain multiplier applied to the determined cornering lateral acceleration. While in various implementations the gain multiplier may be adjusted responsive to a user responsiveness input, in various other implementations the controller may be configured to automatically and/or dynamically adjust the gain multiplier. For example, the controller may be configured to adjust the gain multiplier based on a pre-set value, the operating conditions of the vehicle seat system, a previously provided sensitivity input, or an input received from the speed sensor.

In act 410, the method 400 may include the act of providing a force command to the actuator to move the seat based on the command signal. As discussed above, the actuator can induce roll (and/or pitch) into the vehicle seat, or a support structure attached to the vehicle seat, to lean-in the seat during a cornering event. The force command causes the actuator to rotate the seat by the angle $\theta_2$. In particular, electrical energy generated by the controller is delivered to the actuator causing the actuator to extend or retract to a predetermined position specified by the command signal, causing the seat to rotate. As discussed above, the linear actuator can be, for example, an electromagnetic linear motor, a hydraulic cylinder, or a pneumatic cylinder. The linear actuator instead may also be some other type of actuator such as a rotary actuator (electromagnetic, hydraulic, or pneumatically powered) that is coupled between the seat and the floor of the vehicle.

Figure 5C:
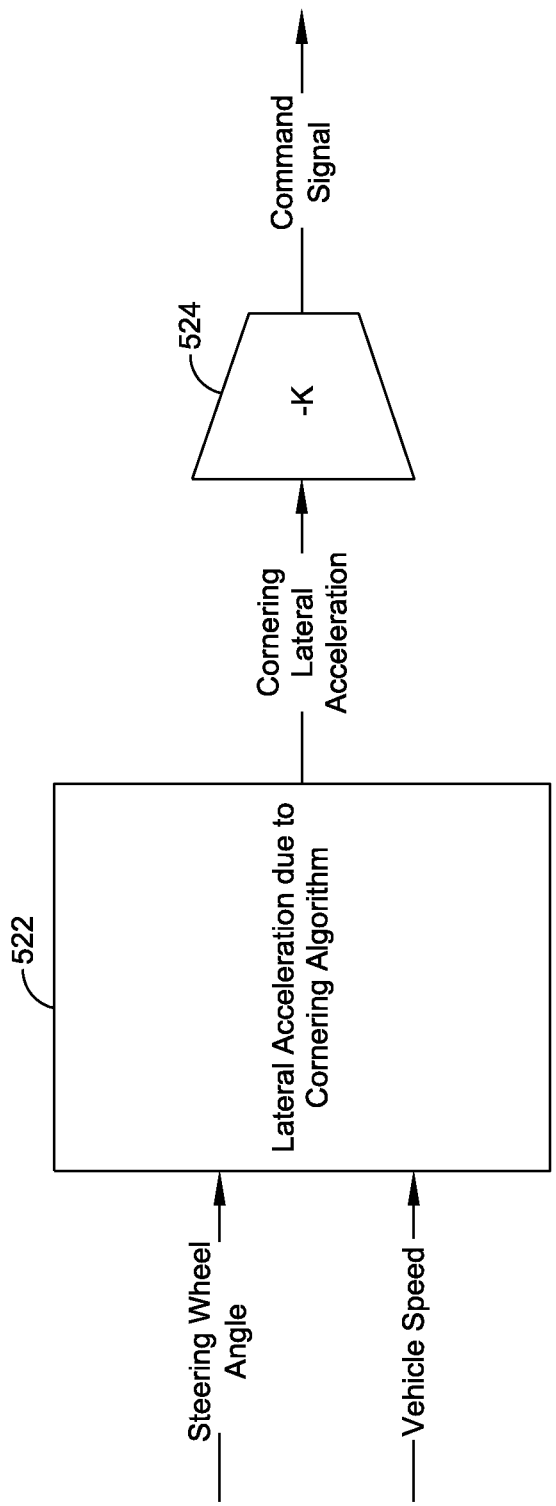

Turning to FIGS. 5A-5C, shown are example block diagrams for generating a command signal for instructing movement of an active payload support system (e.g., the vehicle seat and systems discussed above with reference to FIGS. 1-3), during a cornering event. FIGS. 5A-5C are described with continuing reference to FIGS. 1-4. Similar processes may be performed by the controller of various examples to generate a command signal for instructing movement of an active payload support system during a forward acceleration event or braking event.

As discussed above with reference to FIGS. 1-4, a controller may receive a first input from at least a first sensor positioned to measure movement of the vehicle. With reference to FIG. 5A, the first input includes a vehicle roll rate about an axis extending parallel to a direction of travel of the vehicle. The controller may also receive a second input from at least a second sensor positioned to measure movement of the vehicle. In one implementation, the second input includes a total lateral acceleration of the vehicle in a direction substantially perpendicular to the axis parallel to the direction of travel of the vehicle around the corner. Further, the controller may determine a distance between a first axis about which the seat rotates and a second axis about which the vehicle may rotate (e.g., distance L1 shown in FIGS. 1A and 1B). Responsive to receiving the roll rate and total lateral acceleration, and determining the distance L1, the controller is configured to execute a series of instructions for determining the cornering lateral acceleration of the vehicle. Block 502 represents at least one algorithm to be performed by the processor to determine the cornering lateral acceleration during the cornering event. At block 502, the controller may determine the cornering lateral acceleration according to:

$$\left(\frac{d(\text{roll rate})}{dt} * L1\right) + \text{total lateral acceleration.}$$

The controller, in one implementation, calculates a derivative of the roll rate, and multiplies that derivative by the distance between the first axis and the second axis. The result is added to the total lateral acceleration to determine the cornering lateral acceleration of the vehicle.

Responsive to determining the cornering lateral acceleration, at block 504, the controller may generate the command signal based at least on the determined cornering lateral acceleration. For instance, at block 504 the controller may apply one or more gain and saturation processes. As discussed above, the command signal may be about 0.50 to 1.00 degrees per (m/s/s) of cornering lateral acceleration. In such an example, the controller is adapted to saturate the command angle at positive or negative saturation angle (e.g., ±4.0 degrees). Such an implementation may prevent over compensation for a given cornering event. As shown in FIG. 5A, the controller may output the command signal. In various implementations, the controller is configured to adjust a gain of the command signal responsive to receiving a responsiveness command, which may include, for example, a user input. At block 504, the controller is configured to apply a gain multiplier corresponding to the responsiveness input to the command signal. For example, the responsiveness command may be selected from a range of values corresponding to gain multipliers within a range of 0.50-1.25 deg/(m/s/s).

Turning to FIG. 5B, in one implementation the first input includes the yaw rate about an axis extending vertically through the vehicle. The controller may also receive a second input from at least a second sensor positioned to measure movement of the vehicle. In one implementation, the second sensor includes a speed sensor, and the second input includes a speed of the vehicle. Responsive to receiving the yaw rate and the vehicle speed, the controller is configured to execute a series of instructions for determining the cornering lateral acceleration of the vehicle. Block 512 indicates at least one algorithm to be performed by the processor to determine the cornering lateral acceleration during the cornering event. At block 512, the controller may determine the cornering lateral acceleration according to:

yaw rate*speed.

In one implementation, the controller is configured to multiply the yaw rate and the vehicle speed to determine the cornering lateral acceleration.

Responsive to determining the cornering lateral acceleration, at block 514, the controller may generate the command signal based at least on the determined cornering lateral acceleration. At block 514 the controller may execute a series of instructions substantially the same as those described above with reference to block 504 of FIG. 5A. The controller may also output the command signal. In various implementations, the controller is configured to adjust a gain of the command signal responsive to receiving a responsiveness command, which may include, for example, a user input. At block 514, the controller is configured to apply a gain multiplier corresponding to the responsiveness input to the command signal, such as is described above with reference to block 504 of FIG. 5A.

Turning to FIG. 5C, in one implementation the first input includes the steering wheel angle of a steering wheel of the vehicle. The controller may also receive a second input from at least a second sensor positioned to measure movement of the vehicle. In one implementation, the second sensor includes a speed sensor, and the second input includes a speed of the vehicle. Responsive to receiving the steering wheel angle and the vehicle speed, the controller is configured to execute a series of instructions for determining the cornering lateral acceleration of the vehicle. Block 522 indicates at least one algorithm to be performed by the processor to determine the cornering lateral acceleration during the cornering event. At block 522, the controller may determine the cornering lateral acceleration according to:

steering wheel angle*k(speed).

In one implementation, the controller is configured to multiply the steering wheel angle and the vehicle speed and a predetermined ratio of degrees/g to determine the cornering lateral acceleration.

Responsive to determining the cornering lateral acceleration, at block 524, the controller may generate the command signal based at least on the determined cornering lateral acceleration. At block 524 the controller may execute a series of instructions substantially the same as those described above with reference to block 504 of FIG. 5A. The controller may also output the command signal. In various implementations, the controller is configured to adjust a gain of the command signal responsive to receiving a responsiveness command, which may include, for example, a user input. At block 524, the controller is configured to apply a gain multiplier corresponding to the responsiveness input to the command signal, such as is described above with reference to block 504 of FIG. 5A.

Based on the generated command signal, the controller may provide one or more force commands to the actuator to move the seat to a desired position to lean-in the seat during the roll event. Accordingly, various aspects and implementations described herein provide a vehicle seat and vehicle seat system configured to lean an occupant positioned on the seat into a corner along which the vehicle is traveling. The vehicle seat may vary the angle at which the seat is positioned relative to the cornering lateral acceleration of the vehicle during the turn, and return the occupant to a substantially horizontal and level position when leaving the turn. Such aspects and examples provide a natural and stable riding experience for the occupant.

Figure 6:
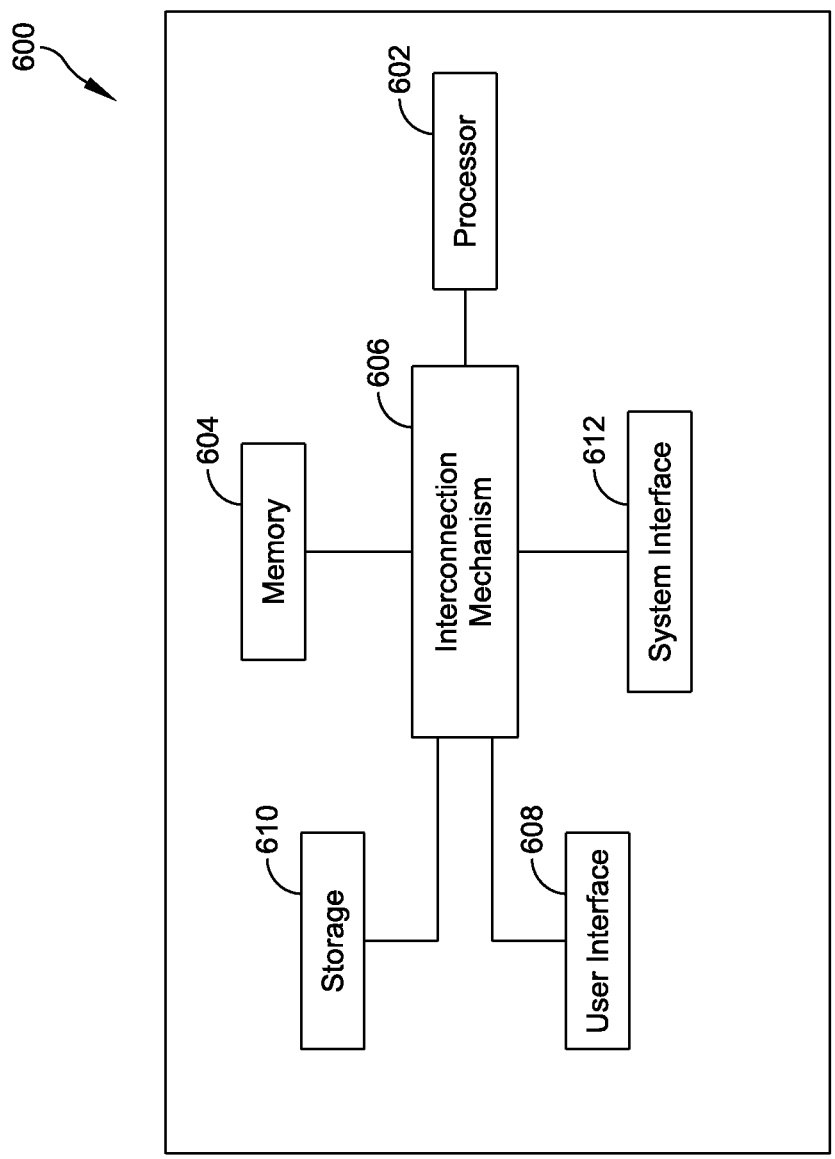
FIG. 6 is an illustration of a controller that may be used with various aspects discussed herein.

Referring to FIG. 6, there is illustrated a block diagram of a controller 600, in which various aspects and functions are practiced. For example, the controller 600 may perform various processes for determining a cornering lateral acceleration and generating a command signal as described herein. FIG. 6 is described with reference to the several aspects and implementations discussed above with reference to FIGS. 1-5C. For example, the controller 600 may include the controller 302 shown in FIG. 3. As shown, the controller 600 can include one or more system components that exchange information. More specifically, the controller 600 can include at least one processor 602, a power source (not shown), a data storage 610, a system interface 612, a user interface 608, a memory 604, and one or more interconnection mechanisms 606. The controller 600 may also include a power source (not shown) that provides electrical power to other components. The at least one processor 602 may be any type of processor or multiprocessor, and for example may include a digital signal processor. The at least one processor 602 is connected to the other system components, including one or more memory devices 604 by the interconnection mechanism 606. The system interface 612 couples one or more sensors or components (e.g., actuator 210) to the at least one processor 602.

The memory 604 stores programs (e.g., sequences of instructions coded to be executable by the processor 602) and data during operation of the controller 600. Thus, the memory 604 may be a relatively high performance, volatile, random access memory such as a dynamic random access memory ("DRAM") or static memory ("SRAM"). However, the memory 604 may include any device for storing data, such as a disk drive or other nonvolatile storage device. Various examples may organize the memory 604 into particularized and, in some cases, unique structures to perform the functions disclosed herein. These data structures may be sized and organized to store values for particular data and types of data.

Components of the controller 600 are coupled by an interconnection mechanism such as the interconnection mechanism 606. The interconnection mechanism 606 may include any communication coupling between system components such as one or more physical buses. The interconnection mechanism 606 enables communications, including instructions and data, to be exchanged between system components of the controller 600.

The controller 600 can also include one or more user interface devices 608 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the controller 600 to exchange information and to communicate with external entities, such as users and other systems.

The data storage element 610 includes a computer readable and writeable data storage medium configured to store non-transitory instructions and other data, and cant include both nonvolatile storage media, such as optical or magnetic disk, ROM or flash memory, as well as volatile memory, such as RAM. The instructions may include executable programs or other code that can be executed by the at least one processor 602 to perform any of the functions described here below.

Although not illustrated in FIG. 6, the controller 600 may include additional components and/or interfaces, such as a communication network interface (wired and/or wireless), and the at least one processor 602 may include a power saving processor arrangement.

Having thus described several aspects of at least one implementation, it is to be appreciated various alterations, modifications, and improvements will readily occur to those skilled in the art. Such alterations, modifications, and improvements are intended to be part of this disclosure, and are intended to be within the spirit and scope of the disclosure. One or more features of any one example disclosed herein may be combined with or substituted for one or more features of any other example disclosed. Accordingly, the foregoing description and drawings are by way of example only.

The phraseology and terminology used herein is for the purpose of description and should not be regarded as limiting. As used herein, the term "plurality" refers to two or more items or components. As used herein, dimensions which are described as being "substantially similar" should be considered to be within about 25% of one another. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of controlling the movement of a seat coupled to a vehicle, the method comprising:
    receiving a first input from at least a first sensor positioned to measure movement of the vehicle, wherein the first input includes a vehicle roll rate;
    receiving a second input from at least a second sensor positioned to measure movement of the vehicle, wherein the second input includes a total lateral acceleration of the vehicle in a direction substantially perpendicular to an axis extending parallel to a direction of travel of the vehicle around a turn;
    determining a distance between a first axis of a pivot about which the seat is configured to rotate, and a second axis about which the vehicle may rotate;
    determining a cornering lateral acceleration of the vehicle in the direction substantially perpendicular to the axis extending parallel to the direction of travel of the vehicle around the turn, the cornering lateral acceleration being determined based at least in part on the total lateral acceleration, the vehicle roll rate, and the distance between the first axis and the second axis;
    generating a command signal based at least in part on the cornering lateral acceleration of the vehicle to instruct an actuator coupled to the seat to rotate the seat about the first axis of the pivot in substantially a direction of the turn; and
    providing a force command to the actuator to move the seat based on the command signal.

2. The method of claim 1, further comprising adjusting a gain of the command signal responsive to receiving a responsiveness command.

3. The method of claim 2, wherein the responsiveness command includes a user input.

4. A seat system for a vehicle, comprising:
    a seat;
    a support structure coupled to the seat and including an actuator configured to rotate the seat about a first axis of a pivot;
    a first sensor positioned to detect movement of the vehicle; and
    a controller configured to:
        receive a first input from the first sensor, wherein the first input includes a vehicle roll rate;
        receive a second input from a second sensor positioned to measure movement of the vehicle, wherein the second input includes a total lateral acceleration of the vehicle in a direction substantially perpendicular to an axis extending parallel to a direction of travel of the vehicle around a turn;
        determine a distance between the first axis of the pivot and a second axis about which the vehicle may rotate;
        determine a cornering lateral acceleration of the vehicle in a direction substantially perpendicular to the axis extending parallel to the direction of travel of the vehicle around the turn, the cornering lateral acceleration being determined based at least in part on the total lateral acceleration, the vehicle roll rate, and the distance between the first axis and the second axis;
        generate a command signal based at least in part on the cornering lateral acceleration of the vehicle to instruct the actuator to rotate the seat about the first axis of the pivot in substantially a direction of the turn; and
        provide a force command to the actuator to move the seat based on the command signal.

5. The seat system of claim 4, wherein the controller is further configured to adjust a gain of the command signal responsive to receiving a responsiveness command.

6. The seat system of claim 5, wherein the responsiveness command includes a user input.

7. A seat for a vehicle, comprising:
    a seat; and
    a controller configured to:
        receive a first input of detected movement of the vehicle, wherein the first input includes the vehicle roll rate;
        receive a second input of detected movement of the vehicle, wherein the second input includes a total lateral acceleration of the vehicle in a direction substantially perpendicular to an axis extending parallel to a direction of travel of the vehicle around a turn;
        determine a distance between a first axis of a pivot about which the seat is configured to rotate, and a second axis about which the vehicle may rotate;
        determine a cornering lateral acceleration of the vehicle in the direction substantially perpendicular to the axis extending parallel to the direction of travel of the vehicle around the turn, the cornering lateral acceleration being determined based at least in part on the total lateral acceleration, the vehicle roll rate, and the distance between the first axis of the pivot and the second axis;
        generate a command signal based at least in part on the cornering lateral acceleration of the vehicle to instruct an actuator coupled to the seat to rotate the seat about the first axis of the pivot in substantially a direction of the turn; and
        provide a force command to the actuator to move the seat based on the command signal.

8. The seat of claim 7, wherein the controller is further configured to adjust a gain of the command signal responsive to receiving a responsiveness command.

9. The method of claim 1, further comprising adjusting a gain multiplier to adjust a gain of the command signal.

10. The method of claim 9, wherein adjusting the gain multiplier includes adjusting the gain multiplier based at least in part on a speed of the vehicle.

11. The method of claim 1, wherein generating the command signal to instruct the actuator coupled to the seat to rotate the seat about the first axis of the pivot in substantially the direction of the turn includes generating the command signal to instruct the actuator to lean-in the seat in substantially the direction of the turn.

12. The method of claim 1, further comprising controlling the actuator coupled to the seat to reposition the seat at a level position after the vehicle has returned to a straight course of travel.

13. The method of claim 1, wherein receiving the second input from at least the second sensor positioned to measure movement of the vehicle includes receiving the second input from a lateral accelerometer positioned at substantially the same location as the first axis of the pivot.

14. The seat system of claim 4, wherein the controller is further configured to adjust a gain multiplier to adjust a gain of the command signal.

15. The seat system of claim 14, further comprising a speed sensor configured to measure a speed of the vehicle, wherein the controller is further configured to adjust the gain multiplier based at least in part on the speed of the vehicle.

16. The seat system of claim 4, wherein in generating the command signal to instruct the actuator to rotate the seat about the first axis of the pivot in substantially the direction of the turn the controller is configured to generate the command signal to instruct the actuator to lean-in the seat in substantially the direction of the turn.

17. The seat system of claim 4, wherein the controller is further configured to instruct the actuator to reposition the seat at a level position after the vehicle has returned to a straight course of travel.

18. The seat system of claim 4, wherein the first sensor is a roll rate gyroscope.

19. The seat system of claim 4, further comprising the second sensor, wherein the second sensor is a lateral accelerometer.

20. The seat system of claim 19, wherein the lateral accelerometer is positioned at substantially the same location as the first axis of the pivot.

21. The seat of claim 8, wherein the responsiveness command includes a user input.

22. The seat of claim 7, wherein the controller is further configured to adjust a gain multiplier to adjust a gain of the command signal.

23. The seat of claim 22, further comprising a speed sensor configured to measure a speed of the vehicle, wherein the controller is further configured to adjust the gain multiplier based at least in part on the speed of the vehicle.

24. The seat of claim 7, wherein in generating the command signal to instruct the actuator coupled to the seat to rotate the seat about the first axis of the pivot in substantially the direction of the turn the controller is configured to generate the command signal to instruct the actuator to lean-in the seat in substantially the direction of the turn.

25. The seat of claim 7, wherein the controller is further configured to instruct the actuator to reposition the seat at a level position after the vehicle has returned to a straight course of travel.

26. The seat of claim 7, wherein the controller is configured to receive the second input from a lateral accelerometer positioned at substantially the same location as the first axis of the pivot.

* * * * *